United States Patent
Loesch et al.

(10) Patent No.: US 11,835,641 B2
(45) Date of Patent: Dec. 5, 2023

(54) METHOD AND DEVICE FOR EVALUATING RADAR SIGNALS

(71) Applicant: Robert Bosch GmbH, Stuttgart (DE)

(72) Inventors: Benedikt Loesch, Stuttgart (DE); Michael Schoor, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 608 days.

(21) Appl. No.: 17/042,564

(22) PCT Filed: Apr. 12, 2019

(86) PCT No.: PCT/EP2019/059581
§ 371 (c)(1),
(2) Date: Sep. 28, 2020

(87) PCT Pub. No.: WO2019/242907
PCT Pub. Date: Dec. 26, 2019

(65) Prior Publication Data
US 2021/0033700 A1    Feb. 4, 2021

(30) Foreign Application Priority Data
Jun. 21, 2018  (DE) ............... 10 2018 210 155.8

(51) Int. Cl.
*G01S 7/35* (2006.01)
*G01S 13/02* (2006.01)

(52) U.S. Cl.
CPC .............. *G01S 7/354* (2013.01); *G01S 13/02* (2013.01); *G01S 7/356* (2021.05)

(58) Field of Classification Search
None
See application file for complete search history.

(56) References Cited

U.S. PATENT DOCUMENTS

| 4,845,507 A | 7/1989 | Archer et al. |
| 6,275,180 B1* | 8/2001 | Dean ............... G01S 13/931 342/195 |
| 2016/0033632 A1 | 2/2016 | Searcy et al. |
| 2016/0131752 A1* | 5/2016 | Jansen ............... G01S 13/42 342/27 |
| 2016/0363651 A1* | 12/2016 | Lim ............... G01S 13/426 |

FOREIGN PATENT DOCUMENTS

| DE | 102011084610 A1 | 4/2013 |
| DE | 102016210043 A1 | 12/2016 |
| DE | 102015221163 A1 | 5/2017 |
| DE | 102015222884 A1 | 5/2017 |
| EP | 3021132 A1 | 5/2016 |

(Continued)

OTHER PUBLICATIONS

International Search Report for PCT/EP2019/059581, dated Jul. 2, 2019.

*Primary Examiner* — Whitney Moore
(74) *Attorney, Agent, or Firm* — NORTON ROSE FULBRIGHT US LLP; Gerard Messina

(57) ABSTRACT

An improved evaluation of radar signals, in particular radar signals received by a Uniform Linear Array (ULA) antenna. Through the application of a plurality of different beamformings to the radar signals, drops in the gain can be compensated by the beamforming.

9 Claims, 2 Drawing Sheets

(56) References Cited

FOREIGN PATENT DOCUMENTS

| | | | |
|---|---|---|---|
| JP | H11234023 | A | 8/1999 |
| JP | 2002185378 | A | 6/2002 |
| JP | 2003318630 | A | 11/2003 |
| JP | 2009168452 | A | 7/2009 |
| JP | 2011180004 | A | 9/2011 |
| JP | 2017166930 | A | 9/2017 |
| JP | 2021527814 | A | 10/2021 |
| WO | 9729388 | A1 | 8/1997 |
| WO | 2016055455 | A1 | 4/2016 |
| WO | 2017183097 | A1 | 10/2017 |

\* cited by examiner

METHOD AND DEVICE FOR EVALUATING RADAR SIGNALS

FIELD

The present invention relates to a method for evaluating radar signals, and to a device for evaluating radar signals.

BACKGROUND INFORMATION

In the automotive field, radar sensors are increasingly being used for more and more tasks. For example, they provide data from the surrounding environment of a vehicle that can be evaluated and further processed by a driver assistance system. In addition, radar sensors are of great importance in particular in the area of automated driving. In particular, angular resolution with simultaneous high sensitivity, i.e., given a large field of location, is of decisive importance.

In order to reduce the computing outlay, for such radar systems antenna arrays can be used that have a regular configuration of the antennas; these are so-called Uniform Linear Arrays (ULA). Here, using a fast Fourier transformation (FFT) an efficient beamforming can be realized.

German Patent Application No. DE 10 2011 084 610 A1 describes an angle-resolving radar sensor for motor vehicles having an antenna that includes a plurality of antenna elements. Each antenna element can be switched to one of a plurality of evaluation channels, and can be coupled to an evaluation device in order to determine the angle of incidence of a received signal.

SUMMARY

The present invention provides a method for evaluating radar signals, and a device for evaluating radar signals.

In accordance with an example embodiment of the present invention, a method for evaluating radar signals is provide, having a step of reception of a plurality of radar signals by an antenna array. In addition, the example method includes a step of applying a first beamforming to a radar signal of the plurality of radar signals, and a step of applying a second beamforming to a radar signal of the plurality of radar signals. The second beamforming is in particular different from the first beamforming. Finally, the method includes a step of evaluating the received radar signals using the results of the first beamforming and of the second beamforming.

In accordance with an example embodiment of the present invention, a device is provided for evaluating radar signals, in particular a plurality of radar signals, that have been received by an antenna array. The device includes a first processing device, a second processing device, and an evaluation device. The first processing device is designed to apply a first beamforming to a radar signal of the plurality of radar signals. The second processing device is designed to apply a second beamforming to a radar signal of the plurality of radar signals, the second beamforming being different from the first beamforming. The evaluation device is designed to evaluate the received radar signals using the results of the first beamforming and of the second beamforming.

The present invention is based on the finding that, when there is a digital beamforming of the radar signals by an antenna array, a fluctuating gain occurs over the angular range of the field of location. In particular, significant drops in the gain are recorded over the angular range of the field of location.

Therefore, in accordance with the present invention, this finding is taken into account, and an evaluation of the radar signals is provided that counteracts these drops in the gain, and enables an evaluation with an at least approximately more homogenous curve over the angular range of the field of location.

For this purpose, an approach of the present invention is to apply a plurality of different beamformings to the radar signals, the different beamformings ideally complementing one another to form an at least approximately homogenous antenna gain. For example, a second beamforming can be applied to the radar signals by the antenna array, the second beamforming having its maxima preferably in the regions of the minima of the first beamforming. In this way, the drops in gain of the first beamforming can be at least approximately compensated by the second beamforming.

The radar signals that are to be evaluated by the method according to the present invention can preferably be provided by an antenna array having uniformly distributed antenna elements that are situated in equidistant fashion. For example, each antenna element can provide a signal for a receive channel of a radar signal. In such antenna arrays having antenna elements configured in equidistant fashion (Uniform Linear Array, or ULA), the beamforming can be realized particularly efficiently by a fast Fourier transform (FFT). In this way, a particularly fast and efficient beamforming is possible that requires a relatively low hardware outlay for the calculation.

In the present context, a radar signal is to be understood as the sum of all signals of the individual receive channels of the individual antenna elements of the antenna array. Here, a radar signal will regularly, preferably periodically, send out radio-frequency signals that are reflected by an object to be detected, and the reflected signals can then be received by the antenna elements of the antenna array and provided to the individual receive channels for further processing. Through the multiple sending out of radio-frequency signals and the reception of the corresponding radar responses, in this way a plurality of radar signals can also be received in a temporal sequence one after the other and can then be evaluated.

In the beamforming, a plurality of beams can be formed. In particular, a separate beamforming can be carried out for each antenna. Thus, for N antennas there exist N beams, or radar signals.

According to a specific embodiment of the present invention, the first beamforming and the second beamforming are each applied to the same radar signal. In other words, the first beamforming and the second beamforming are each applied to the same signals of the receive channels of the antenna elements of the antenna array. Thus, a multiple beamforming takes place for each received radar signal.

According to an alternative specific embodiment of the present invention, the first beamforming and the second beamforming are applied to different radar signals. For example, in a temporal sequence of received radar signals, a first beamforming and a second beamforming can each be applied in alternating fashion. In this way, it is not necessary to increase the computing outlay for the two different beamformings.

According to a specific embodiment of the present invention, the application of the first beamforming and/or the application of the second beamforming take place using a complex window function. Such complex window functions enable a particularly simple and efficient adaptation of the beamforming to the requirements of the particular case.

According to a specific embodiment of the present invention, the maximum of the second beamforming is shifted by half a bin relative to the maximum of the first beamforming. Due to the shifting of the two beamformings by half a bin, the maxima of the second beamforming are situated in the areas of the minima of the first beamforming. In this way, an at least approximately homogenous curve of the gain over the angular range of the field of location can be realized. In beamforming, in particular a beamforming using FFT, a bin corresponds to the distance between two adjacent maxima of the antenna beam.

According to a specific embodiment of the present invention, the example method in addition includes a step of applying at least one further beamforming to a radar signal of the plurality of radar signals. Through the application of three or more different beamformings, a further homogenization of the gain over the field of location can be realized. Here it will be understood that, in the case of more than two different beamformings, the individual beamformings are each adapted in such a way that when superposed they result in an antenna gain that is as homogenous as possible. For example, given three beamformings the maxima of the individual beamformings can each be shifted by one-third relative to one another, or, in general, given n beamformings they can each be shifted by 1/n.

According to a specific embodiment of the present invention, each radar signal of the plurality of radar signals includes receive signals of a plurality of antenna elements of the antenna array. As described above, the antenna array is preferably an antenna array having antenna elements configured equidistant from one another. As a result, the beamforming can be carried out particularly efficiently by a fast Fourier transformation.

The above embodiments and developments can be combined with one another in any appropriate manner. Further embodiments, developments, and implementations of the present invention also include combinations not explicitly named of features of the present invention described above or in the following relating to the exemplary embodiments. In particular, the person skilled in the art will also add individual aspects to the respective basic forms of the present invention, as improvements or additions.

BRIEF DESCRIPTION OF THE DRAWINGS

Below, further features and advantages of the present invention are explained on the basis of the Figures.

DETAILED DESCRIPTION OF EXAMPLE EMBODIMENTS

Figure 1:
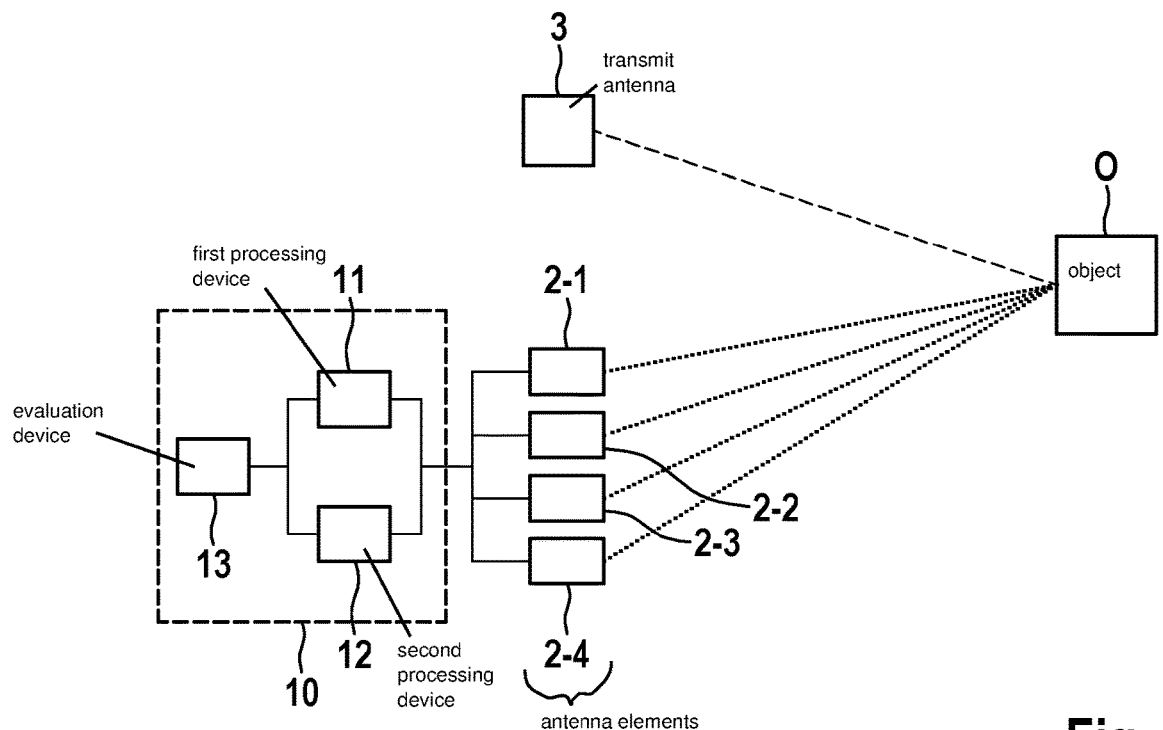
FIG. 1 shows a schematic representation of a diagram of a device for evaluating radar signals according to a specific example embodiment of the present invention.

FIG. 1 shows a schematic representation of a diagram of a radar system having a device 1 for evaluating radar signals. The radar system includes at least one transmit antenna 3 that sends out radio-frequency signals. The transmitted signals can be reflected by an object O. The reflected signals are then received by the antenna elements 2-$i$, and are provided at device 1 for evaluating the radar signals. In the present context, a radar signal is understood as the totality of the receive channels of all antenna elements 2-$i$ that correspond to a transmitted radar signal. Due to the multiple sending out of transmit signals by transmit antenna 3, a temporal sequence of a plurality of radar signals is also received by antenna elements 2-$i$.

The antenna array having antenna elements 2-$i$ is preferably an antenna array having a plurality of antenna elements 2-$i$ configured equidistant from one another, the individual antenna elements 2-$i$ being situated on a virtual axis.

The received radar signals are provided in device 1 for evaluating the radar signals. Device 1 for evaluating the radar signals includes at least one first processing device 11, a second processing device 12, and an evaluation device 13. Using the signals of the antenna elements 2-$i$, first processing device 11 calculates a first beamforming for each radar signal. In particular in the above-described configuration of an antenna array having uniformly distributed antenna elements 2-$i$ (ULA), the beamforming can be carried out particularly easily by a fast Fourier transformation. Because the principles of such a beamforming using FFT are conventional, a corresponding description is omitted here. The digital beamforming of the radar signal can for example be realized by applying a suitable window function.

Analogous to first processing device 11, second processing device 12 also carries out a beamforming. However, the beamforming by second processing device 12 is different from the beamforming by first processing device 11. In particular, second processing device 12 can realize a beamforming whose maxima are situated in the minima of the first beamforming. This can be realized for example by using, for the second beamforming, a window function having a complex part that causes the maxima to be shifted by half a bin. Such a window function can be realized for example by the following equation:

$$w(n)=\exp(j*2*\mathrm{pi}*0.5*n/N)=\exp(j*\mathrm{pi}*n/N)$$

where
  w: the complex window function
  N: the number of antenna elements 2-$i$ of the antenna array
  n: the receive channel of an antenna element 2-$i$ of the antenna array The carrying out of two beamformings displaced by half a bin is identical to a beamforming in which the length is doubled in the FFT with zero padding. However, this increases the computing outlay.

As described above, the two beamformings can be realized by the two separate processing devices 11 and 12. However, it will be understood that the two beamformings are also realized by a common processing device that has adequate computing capacity to be able to carry out the calculation of the two beamformings.

Figure 2:
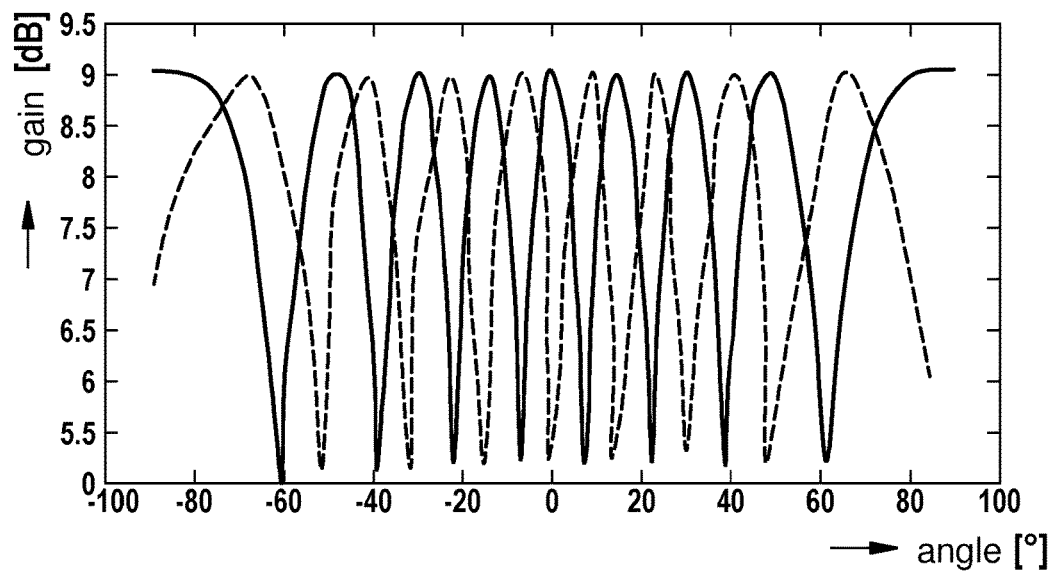
FIG. 2 shows a schematic representation of the antenna gain after the beamformings according to a specific example embodiment of the present invention.

FIG. 2 shows, as a solid line, the gain according to the first beamforming. In addition, FIG. 2 shows, as a dashed line, the gain of the second beamforming. Here, the second beamforming is set such that the maxima of the second beamforming agree at least approximately with the minima of the first beamforming. In this way, it can easily be seen that an at least approximately homogenous curve of the antenna gain can be achieved by superposing the two curves. In this way, a good detection of objects can be achieved over the entire field of location.

In addition to the simultaneous application, described above, of two different beamformings to the channels of a radar signal received at a common time, it is also possible to apply only one beamforming to each radar signal respectively, and to apply a different beamforming to each of a plurality of radar signals received temporally one after the other. For example, a first beamforming can be applied to a first radar signal received at a first time, and a second beamforming can be applied to a radar signal that is subsequently received at a second, later time. A further radar signal that is then received can again be processed with a first beamforming, etc. In this way, the advantages of different beamformings can be used without resulting in an additional, increased computing outlay.

It will be understood that the representation according to FIG. 1, having only one transmit antenna 3 and only four receive antenna elements 2-i, is to be understood only schematically, and does not represent any limitation of the present invention. Rather, numbers differing therefrom of transmit antennas 3 and/or receive antenna elements 2-i can also be realized.

Correspondingly, the present invention is also not limited only to the application of two different beamformings. Rather, it is also possible to carry out more than two different beamformings simultaneously or one after the other. In this way, a further homogenization of the antenna gain curve can be achieved. When the number of different beamformings is increased, the shift of the individual beamformings relative to one another is to be correspondingly adapted. For example, in the case of three different beamformings the maxima of the individual beamformings can be shifted relative to one another by one-third each.

The results of the individual beamformings are finally supplied to a processing device 13 that, using the individual beamformings, can carry out a processing of each of the radar signals. For example, here a detection of objects, a determination of an object speed, or the like can be carried out. Of course, any other suitable evaluations of the radar signals using the plurality of beamformings are also possible.

Figure 3:
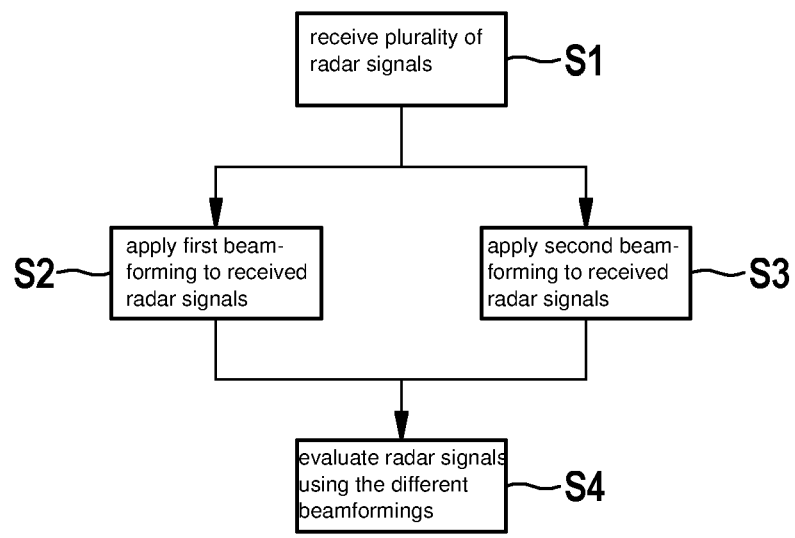
FIG. 3 shows a schematic representation of a flow diagram that forms the basis of an example method for evaluating radar signals according to a specific embodiment of the present invention.

FIG. 3 shows a schematic representation of a flow diagram that forms the basis of a method for evaluating radar signals according to a specific example embodiment of the present invention. In step S1, a plurality of radar signals are received by an antenna array having antenna elements 2-i. In step S2, a first beamforming is applied to a received radar signal, and in step S3 a second beamforming is applied to a radar signal. As already described, the beamforming and the second beamforming can either be applied to one and the same radar signal, or only one beamforming is applied successively to a plurality of radar signals received temporally one after the other.

Finally, in step S4 there takes place an evaluation of the radar signals using the different beamformings. The evaluation can for example include a detection of one or more objects or a determination of the speed of an object. Of course, any other suitable evaluations of the radar signals are also possible.

In sum, the present invention relates to an improved evaluation of radar signals, in particular radar signals received using a ULA antenna. Through the application of a plurality of different beamformings to the radar signals, drops in the gain can be compensated by the beamforming.

What is claimed is:

1. A method for evaluating a plurality of radar signals received by an antenna array, the method comprising:
   receiving, by antenna elements of the antenna array, the plurality of radar signals;
   applying, via a first processing device, a first beamforming to a radar signal of the plurality of radar signals;
   applying, via a second processing device, a second beamforming to a radar signal of the plurality of radar signals, the second beamforming being different from the first beamforming; and
   evaluating, via an evaluation device, the received plurality of radar signals using results of the first beamforming and the second beamforming;
   wherein by transmitting, by a transmitting antenna, multiple radio-frequency signals and receiving corresponding radar responses, the plurality of radar signals are received in a temporal sequence one after the other and are then evaluated, wherein a plurality of beams can be formed by the beamformings, and wherein a separate beamforming is performed for each antenna of the antenna array, so that for N antennas there are N beams or N radar signals, and
   wherein one of the beamformings is performed using a Fast Fourier Transform (FFT), wherein another of the beamformings is performed using a window function, wherein the beamforming, which is performed using the window function, has a maxima situated in a minima of the first beamforming, and wherein the window function has a complex part that causes the maxima to be shifted, and
   wherein a radar signal corresponds to a totality of receive channels of all antenna elements corresponding to a transmitted radar signal, and wherein by the transmitting of the multiple radio-frequency signals by the transmitting antenna, the temporal sequence of the plurality of radar signals is received by the antenna elements.

2. The method as recited in claim 1, wherein the first beamforming and the second beamforming are each applied to the same radar signal.

3. The method as recited in claim 1, wherein the first beamforming and the second beamforming are each applied to different radar signals of the received plurality of radar signals.

4. The method as recited in claim 1, wherein the applying of the first beamforming and/or the applying of the second beamforming includes applying a complex window function.

5. The method as recited in claim 1, wherein a maximum of the second beamforming is shifted by half a bin relative to a maximum of the first beamforming.

6. The method as recited in claim 1, further comprising:
   applying at least one further beamforming to a radar signal of the plurality of radar signals.

7. The method as recited in claim 1, wherein each radar signal of the plurality of radar signals respectively includes receive signals of a plurality of antenna elements of the antenna array.

8. A device for evaluating a plurality of radar signals received by an antenna array, comprising:
   a first processing device to apply a first beamforming to a radar signal of the plurality of radar signals;
   a second processing device to apply a second beamforming to a radar signal of the plurality of radar signals, the second beamforming being different from the first beamforming; and
   an evaluation device to evaluate the received radar signals using results of the first beamforming and the second beamforming;
   wherein by transmitting, by a transmitting antenna, multiple radio-frequency signals and receiving corresponding radar responses, the plurality of radar signals are received in a temporal sequence one after the other and are then evaluated, wherein a plurality of beams can be formed by the beamformings, and wherein a separate beamforming is performed for each antenna of the antenna array, so that for N antennas there are N beams or N radar signals, wherein one of the beamformings is performed using a Fast Fourier Transform (FFT), wherein another of the beamformings is performed using a window function, wherein the beamforming, which is performed using the window function, has a maxima situated in a minima of the first beamforming, and wherein the window function has a complex part that causes the maxima to be shifted, and wherein a radar signal corresponds to a totality of receive channels of all antenna elements corresponding to a transmitted radar signal, and wherein by the transmitting of the multiple radio-frequency signals by the transmitting antenna, the temporal sequence of the plurality of radar signals is received by the antenna elements.

9. The device as recited in claim 8, wherein the plurality of antenna elements of the antenna array are situated in equidistant fashion relative to one another along a virtual axis.

\* \* \* \* \*